J. J. CARNEY.
LUBRICATING APPARATUS.
APPLICATION FILED NOV. 8, 1915.
1,291,399.
Patented Jan. 14, 1919.
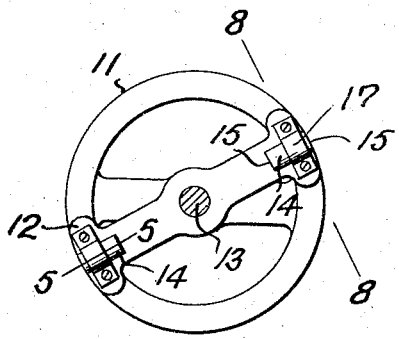
FIG. 1.
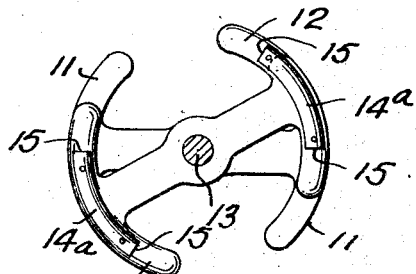
FIG. 2.
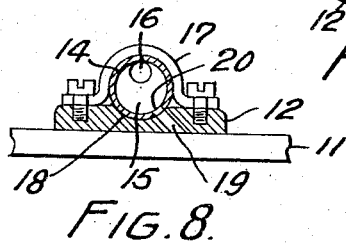
FIG. 8.
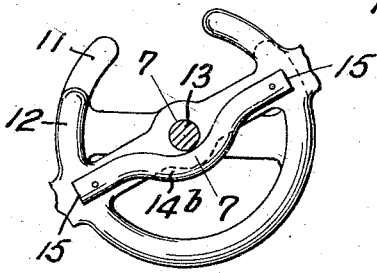
FIG. 3.
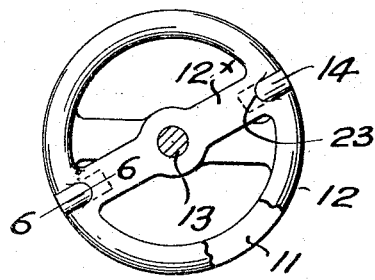
FIG. 4.
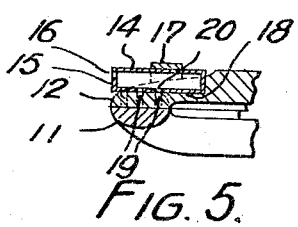
FIG. 5.
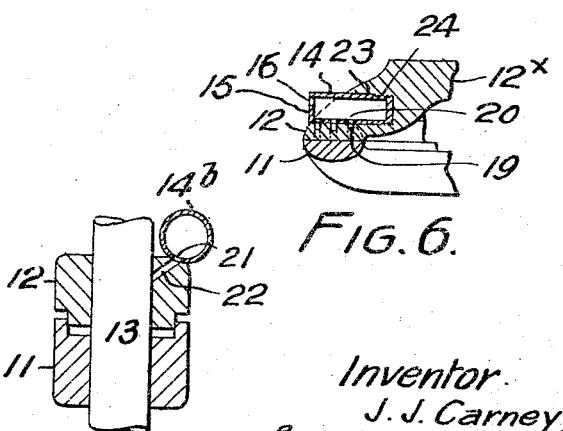
FIG. 6.
FIG. 7.
Witnesses
Inventor.
J. J. Carney

UNITED STATES PATENT OFFICE.

JAMES J. CARNEY, OF HAVERHILL, MASSACHUSETTS.

LUBRICATING APPARATUS.

1,291,399.

Specification of Letters Patent.   Patented Jan. 14, 1919.

Application filed November 8, 1915.   Serial No. 60,297.

*To all whom it may concern:*

Be it known that I, JAMES J. CARNEY, a citizen of the United States, and resident of Haverhill, in the State of Massachusetts, have invented certain new and useful Improvements in Lubricating Apparatus, of which the following is a full, clear, and exact description.

This invention relates to improvements in lubricating apparatus for turntables or swivels upon which the axles of vehicles turn under the bodies thereof, and the object of the invention is to provide a simple, durable, inexpensive and efficient means for supplying a lubricant to these swivels.

The swivels vary considerably in design but all consist of two more or less arcuate members bearing one against the other. The lubricating device consists of one or more tubes of suitable length closed at the ends to form a lubricant reservoir, secured in any suitable manner to the upper member of the swivel, and provided with a suitable number of outlets communicating with the bearing surfaces.

In the drawings which illustrate the invention:—

Figure 1 is a plan view of a swivel showing one form of the device.

Fig. 2 is a plan view of another form of swivel showing a slightly different shape of lubricator.

Fig. 3 is a plan view of still another form of swivel showing a further modified form of lubricator.

Fig. 4 is a plan view of a further form of swivel showing a lubricator, as in Fig. 1, attached in a slightly different manner.

Fig. 5 is an enlarged vertical section on the line 5—5, Fig. 1.

Fig. 6 is an enlarged vertical section on the line 6—6, Fig. 4.

Fig. 7 is an enlarged section on the line 7—7, Fig. 3.

Fig. 8 is an enlarged section on the line 8—8 of Fig. 1.

Before proceeding with the description, it must be understood that any one of the forms of lubricator shown may be applied to any form of swivel shown, or to any other form, if desired, so that the invention is not limited to the particular combinations of specific forms.

Referring more particularly to the drawings, 11 designates the lower member of the swivel, which in Figs. 1 and 4 is a complete circle, in Fig. 2, two separated arcuate members, and in Fig. 3, a continuous arcuate member less than the complete circle; and 12 designates the upper member of the swivel, which in Fig. 1 is merely a bar having its ends bearing on the lower member, but in the remaining figures is formed similarly to the lower member. The two members are revolubly connected by a bolt or king pin 13. It will be understood that nothing of invention is claimed for these members, as the forms illustrated are those commonly found in vehicles, one being attached to the underframe of the vehicle and the other to the axle.

The lubricating device consists of a tube 14 having closed ends 15, through one of which an aperture 16 is formed for the introduction of the lubricant. These tubes 14 are mounted on the upper swivel member 12 and secured either by riveting or by clamps 17. Where the swivel member is not of suitable form, a shallow channel 18 may be provided for the reception of the tube 14, as clearly shown in Fig. 8. Before the tube is applied, a suitable number of apertures 19 are drilled on an incline through the upper swivel member, so as to open in the bearing surface. The tubes 14 are provided with apertures 20 which register with the apertures 19, so that the lubricant may flow from the tube through the apertures 20 and 19 to the bearing surface. The inclination of these outlet passages retards the flow of heavy lubricant used, so that a comparatively small supply of lubricant in the tubes will escape very slowly and keep the swivel lubricated for a long period of time. It is obvious that the lubricant will flow much more slowly through the inclined passage than it would through a vertical passage.

In Fig. 1, the tubes 14 are shown radially disposed, while in Fig. 2, the tubes, designated 14ᵃ are slightly curved in conformity with the swivel member and circumferentially disposed. Otherwise, the arrangement is exactly as described.

In Figs. 3 and 7, a development of the idea is illustrated. Instead of using separate tubes on opposite sides of the center, a single tube 14ᵇ is used, which extends diametrically across the swivel, being bent intermediate the ends to pass the king pin, and provided with an aperture 21 communicating with the passage 22 formed in the swivel member, through which lubricant may flow to the king pin.

Fig. 4 illustrates a slightly different method of attachment which may be resorted to where the cross bar 12* of the swivel member is sufficiently thick and sufficiently arched. Instead of clamping or riveting the tube in position, a pocket 23 is bored or otherwise formed in the swivel member into which the tube 14 enters. The tube may be held in place in this pocket merely by the tightness of the fit, or by interengaging screw threads 24 formed on the swivel member and tube.

It will be obvious that a number of different forms of tube and methods of attachment can be devised, which it is not possible to contemplate in advance, and that therefore, all such variations and modifications which include a reservoir supplying lubricant through an inclined passage must be construed as included in the present invention. It will also be understood that if it is desired to regulate or entirely shut off the flow of lubricant, this may be done by turning the tube 14 to bring its apertures out of register with the passages in the swivel member.

Having thus described my invention, what I claim is:—

1. In a device of the character described, the combination with upper and lower swivel members having a lubricant passage in the upper member, and a lubricant reservoir rotatably mounted on said member having an outlet movable into and out of register with the passage by rotation of the reservoir.

2. In a device of the character described, the combination with upper and lower swivel members revolubly mounted on a bolt, the upper member having passages through which a lubricant is adapted to pass to the lower member, a reservoir extending across the upper member and having passages alining with the passages in the upper member and means for lubricating the bolt from the reservoir, substantially as described.

In witness whereof, I have hereunto set my hand, in presence of two witnesses.

JAMES J. CARNEY.

Witnesses:
C. R. W. ALLEN,
W. J. CARNEY.